(12) United States Patent
Hawkins et al.

(10) Patent No.: US 11,788,925 B1
(45) Date of Patent: Oct. 17, 2023

(54) MONITORING SYSTEM FOR A COMPONENT IN A CUTTING EDGE

(71) Applicant: Ironhawk Industrial Distribution, LLC, Euclid, OH (US)

(72) Inventors: Patrick Hawkins, Euclid, OH (US); Erik Wolfe, Richmond Heights, OH (US); Shannon V. McCue, Chagrin Falls, OH (US)

(73) Assignee: IronHawk Industrial Distribution LLC, Euclid, OH (US)

( * ) Notice: Subject to any disclaimer, the term of this patent is extended or adjusted under 35 U.S.C. 154(b) by 605 days.

(21) Appl. No.: 16/787,805

(22) Filed: Feb. 11, 2020

(51) Int. Cl.
*E01H 5/06* (2006.01)
*G01D 3/08* (2006.01)
*G01M 99/00* (2011.01)
*E01H 8/04* (2006.01)
*G01M 5/00* (2006.01)

(52) U.S. Cl.
CPC ............. *G01M 5/0033* (2013.01); *E01H 5/061* (2013.01); *G01D 3/08* (2013.01); *G01M 99/007* (2013.01); *E01H 8/04* (2013.01); *G01M 99/002* (2013.01)

(58) Field of Classification Search
CPC ........ G01M 5/0033; E01H 5/061; G01D 3/08; G01M 99/007; G01M 99/002; E01H 8/04
USPC .......................................................... 73/774
See application file for complete search history.

(56) References Cited

U.S. PATENT DOCUMENTS

| | | | |
|---|---|---|---|
| 6,922,924 B2 | 8/2005 | Jones et al. | |
| 7,367,407 B2 | 5/2008 | Lannert | |
| 8,984,778 B2 | 3/2015 | Fox et al. | |

(Continued)

FOREIGN PATENT DOCUMENTS

| | | | |
|---|---|---|---|
| DE | 3517164 A1 * | 1/1987 | |
| JP | 3261480 B2 * | 3/2002 | |

OTHER PUBLICATIONS

"Carbide Components"; Kennametal Inc.; ©1981; 12 pages.
"Competitive Advantage Through Innovation"; Element Six US Corporation; 2016; 7 pages.
"Construction Drilling Systems" Kennametal Inc.; ©2002; 40 pages.
"Cutting and Drilling Systems...For Underground and Surface Mining"; Kennametal Inc.; ©2000; 84 pages.
"Drilling Systems"; Kennametal Inc.; ©2010; 36 pages.
"Faster Drilling, Longer Life, Lower Costs"; Element Six; ©2016; 6 pages.
"Foundation Drilling Cutting Tools"; Kennametal Inc.; ©2013; 24 pages.
"Grinder Tips"; Kennametal Inc.; ©2006; 18 pages.
"Grinder Tips... for Tub and Horizontal Machines"; Kennametal Inc.; ©2009; 3 pages.
"HDD Bit Series"; China PacifiCarbide, Inc.; Oct. 2014; one page.

(Continued)

*Primary Examiner* — Michael P Nghiem
(74) *Attorney, Agent, or Firm* — BakerHostetler

(57) ABSTRACT

A monitoring system that monitors at least one component of a cutting edge supported on an implement, the monitoring system comprising a monitor controller; at least one sensor in sensing communication with the at least one component, the at least one sensor configured to monitor wear of the at least one component; wherein the at least one sensor is connected to the monitor controller to communicate a sensor signal indicative of the wear of the at least one component to the monitor controller; the monitor controller including an output, wherein upon receiving a selected signal from the at least one sensor, the monitor controller is configured to communicate an alert via the output.

15 Claims, 7 Drawing Sheets

(56) References Cited

U.S. PATENT DOCUMENTS

| | | | |
|---|---|---|---|
| 9,290,898 | B2 | 3/2016 | Abramczyk et al. |
| 9,388,544 | B2 | 7/2016 | Reeves et al. |
| 10,113,282 | B2 | 10/2018 | Behan et al. |
| 10,167,598 | B2 | 1/2019 | Stemerman et al. |
| 2011/0162756 | A1 | 7/2011 | Kappel et al. |
| 2011/0227565 | A1* | 9/2011 | Morton ............. G01N 3/56 324/225 |
| 2015/0182166 | A1* | 7/2015 | Evans et al. ....... A61B 5/14556 600/344 |
| 2018/0100279 | A1* | 4/2018 | Aquino .............. E01H 5/061 |
| 2019/0284784 | A1* | 9/2019 | Darlington et al. ..... G07C 3/08 |
| 2020/0340215 | A1* | 10/2020 | Harnetiaux ......... A01C 7/203 |

OTHER PUBLICATIONS

"KenCast™"; Kennametal Inc.; ©2003; 16 pages.
"Mineral Ground Tools - Drilling"; Sandvik Mining and Construction; 2009; 20 pages.
"Parts and More Compact - Quick-change toolholder system HT22"; Wirtgen Group; 2017; 24 pages.
"Parts and More Compact Picks - Generation X and Generation Z"; Wirtgen Group; 2017; 60 pages.
"Plan More Road For Less"; Elements Six GmbH; ©2016; 12 pages.
"Plane More Road for Less"; Element Six; ©2016; 12 pages.
"Product Guide"; China PacifiCarbide, Inc; 16 pages.
"Raise Productivity with Tungsten Carbide Inserts"; Element Six GmbH; ©2014; 20 pages.
"Road Construction Drums & Block Systems"; Kennametal Inc.; ©2010; 6 pages.
"Road Cutting Tools and More..."; Wirtgen Group; 2005; 48 pages.
"Road Milling & Soil Stabilization Tools"; Kennametal Inc.; ©2012; 8 pages.
"Road Planing Picks - E6 Hard Materials"; Element Six; 2010; 12 pages.
"Road Rehabilitation - Road King"; Kennametal Inc.; ©2017; 24 pages.
"Road Rehabilitation"; Kennametal Inc.; ©2007; 40 pages.
"Sandvik Construction Tools - Grading"; Sandvik Construction; 2013; 16 pages.
"Sandvik Construction Tools - Road Planing and Reclaiming"; Sandvik Construction; 2013; 20 pages.
"Sandvik Mining Mineral Ground Tools Product Catalogue"; Sandvik Construction; 2012; 74 pages.
"Shank Mini Bit Series"; China PacifiCarbide, Inc.; Sep. 2011; 29 pages.
"Softrock Tools - E6 Hard Materials"; Element Six; 2010; 38 pages.
"Softrock Tools - E6 Hard Materials"; Element Six; 2010; 40 pages.
"Superior Performance Drives Productivity"; Element Six; ©2016; 28 pages.
"Surface Mining"; Kennametal Inc.; ©2012; 42 pages.
"The Competitive Edge Through Cutting Edge Technology"; Element Six GmbH; ©2016; 8 pages.
"Transform Productivity" Element Six; ©2016; 8 pages.
"Tungsten Carbide Cut to Length Rod Blanks Bur Blank Specification"; China PacifiCarbide, Inc.; Dec. 2002; 14 pages.
"Underground Mining"; Kennametal Inc.; ©2014; 182 pages.
"Weld Tools"; China PacifiCarbide, Inc.; Aug. 2003; 16 pages.
"Wirtgen Group: Parts and More 2013"; Wirtgen Group; ©2013; 572 pages.
"Wirtgen Group: Parts and More 2016"; Wirtgen Group; 2015; 472 pages.
"Wirtgen Group: Parts and More Catalogue 2018"; Wirtgen Group; 2017; 502 pages.
English translation of DE 3517164, Aug. 1987. (Year: 1987).*
English translation of JP 3261480, Dec. 21, 2001. (Year: 2001).*

* cited by examiner

MONITORING SYSTEM FOR A COMPONENT IN A CUTTING EDGE

TECHNICAL FIELD

The present disclosure generally relates to a monitoring system that monitors a component in a cutting edge of an implement. More particularly, the disclosure relates to a monitoring system that includes at least one sensor that monitors wear of a component of the cutting edge and reports an alert a monitor controller.

SUMMARY

The present disclosure generally relates to a monitoring system that monitors at least one component of a cutting edge supported on an implement, the monitoring system comprising a monitor controller; at least one sensor in sensing communication with the at least one component, the at least one sensor configured to monitor wear of the at least one component; wherein the at least one sensor is connected to the monitor controller to communicate a sensor signal indicative of the wear of the at least one component to the monitor controller; the monitor controller including an output, wherein upon receiving a selected signal from the at least one sensor, the monitor controller is configured to communicate an alert via the output.

The present disclosure further relates to a monitoring system for monitoring at least one component in a cutting edge on an implement used in a road maintenance operation, the monitoring system comprising: a sensor assembly including a sensor housing and at least one sensor, the at least one sensor being in sensing communication with the at least one component; a transmitter connected to the at least one sensor, wherein the transmitter generates a sensor signal; a monitor controller including a receiver and an output, wherein the receiver is configured to receive the sensor signal and communicate an alert via the output.

DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of the inventions.

DETAILED DESCRIPTION

Figure 1:
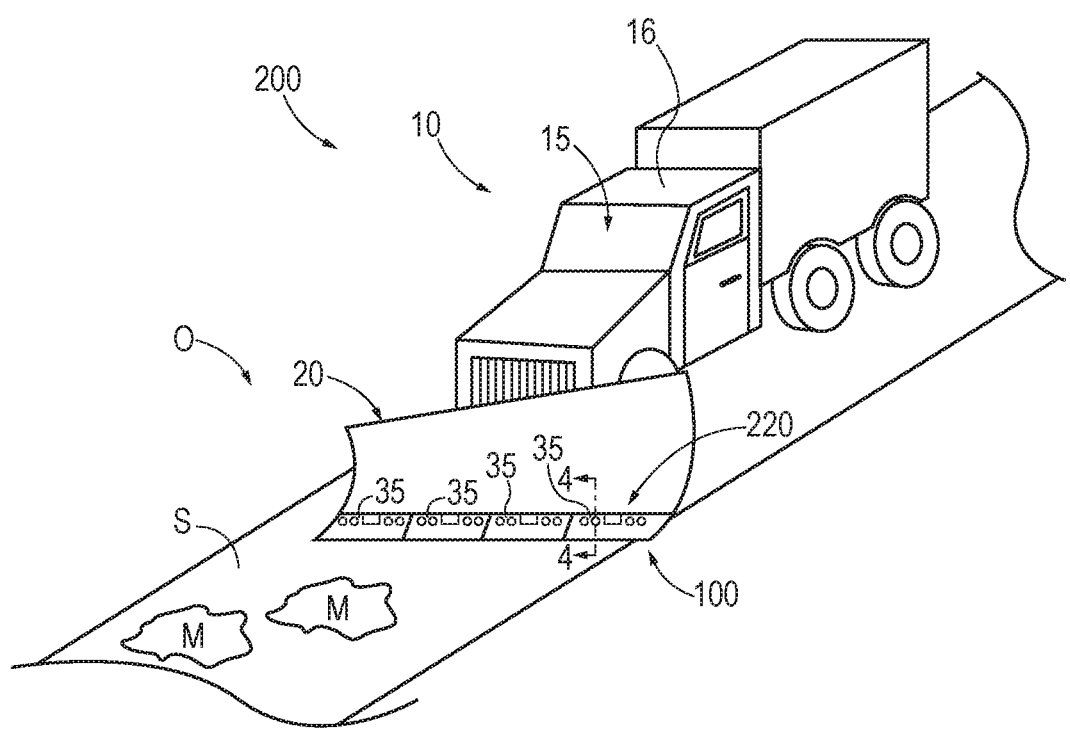
FIG. 1 is a perspective view of a road maintenance vehicle including a monitoring system according to the disclosure.

According to the disclosure, a monitoring system generally indicated by the number 200 may be at least partially incorporated into a vehicle, generally indicated by the number 10. Vehicle 10 may be used to perform operations on a surface. The surface may be comprised of a variety of materials including but not limited to earth; pavement; cement; brick; stone; tiles; metal; loose material, such as gravel, cinders, mulch; plastics; ceramics; and combinations thereof. The operation performed on these surfaces may vary from conditioning the surface itself, such as by raking, leveling or grading, or clearing debris, snow, ice or other material that has fallen or flowed onto the surface. In other examples, the operation may include tearing up, shaving, grinding or otherwise machining the surface.

To perform the operations O, an implement 20 is used to engage the surface S. The type of implement 20 may vary according to the application, and also is not limiting in terms of the disclosure. For example, earth moving equipment may be used in construction applications to condition, groom or grade earth, gravel, fill, concrete, asphalt or other construction material. Road maintenance equipment may be used to clear debris including but not limited to snow, ice, leaves, branches, broken pavement, gravel, sand, cinders and the like from roads. Plowing vehicles, such as snow-plowing vehicles, generally have a curved, shovel-like device commonly known as a moldboard disposed on the front, side, underneath, and/or rear of the vehicle. Construction vehicles may use other implements 20 including but not limited to a bucket, shovel, scoop, rake, scraper, blade, float or the like to perform similar operations. For simplicity and regardless of application, the maintenance vehicle equipment will be generically referred to as an implement 20. The implement 20 may be supported on the vehicle 10 or on a separate piece of equipment that is towed, driven by, otherwise manipulated from the vehicle 10.

In general, each implement 20 includes a portion that contacts or interacts with the material M be cleared or surface S that is being conditioned. This portion will be referred to as a cutting edge herein and generally indicated by the number 104. Due to its direct interaction with the material M being conditioned or cleared by the maintenance vehicle's implement, the cutting edge 104 tends to wear faster than the implement 20 and is designed to be periodically replaced.

Using snow plowing as an example, the cutting edge 104 contacts the snow, ice or other material M that is to be moved relative to a roadway, parking lot or other surface S. As referenced above, depending on the maintenance application, the types of surfaces and material to be moved by a cutting edge 104 are not limiting and will generally be referred to as a surface S, herein. The cutting edge 104 may include a generally solid edge to scrape or push material in a unified fashion or the cutting edge may include a series of projecting portions such as tines or other spaced members to break up material allowing some material to pass through gaps in the cutting edge. For example, some cutting edges include plural milling tools that are arranged as tines with a gap between each milling tool to form a comb-like cutting edge. Other configurations of the cutting edge are possible depending on the particular application and the imagination of the designer.

More generally, the cutting edge 104 is the wear component of implement 20. In this regard, the cutting edge 104 needs replacement before the implement 20, and therefore, is generally removably attached. Various methods of attachment may be used including snap connections, friction fits, welds, adhesives, and mechanical fasteners. The cutting edge 104 may be formed from a single unit spanning the entire width of implement 20 or from plural segments that are mounted on implement 20. With reference to FIG. 1, an implement 20 is shown having multiple segments 35 forming cutting edge 104. Certain segments or portions of the cutting edge 104 may wear more quickly than others due to various factors beyond the control of the operator such as uneven or crowned surfaces or the cutting edge 104 striking objects in or on the surface S. According to the examples described herein, it is desirable to monitor at least a portion of implement 20. For example, wear on the cutting edge 104 or portions thereof provide useful information to the operator and/or those monitoring maintenance of the implement 20, the cutting edge 104 or a specific component(s) on the cutting edge. Since the cutting edge 104 is generally a replaceable part, it is desirable to avoid wearing through this component and causing damaged to other portions of the implement 20 such as a moldboard in the plow example shown in FIG. 1 and described more completely below.

It will be understood that it is common for cutting edge 104 to include multiple components and monitoring may be made of one or more of the components, generally indicated by the number 30, depending on the operation. For example, with reference to FIG. 3, a cutting edge 104 may have a first component 31, such as a support, and a second component 32, such as a tool or insert mounted on the support 31. In the example, first component 31 is a steel support and second component 32 is a carbide insert mounted on first component 31. In the example shown, second component 32 is supported on a lower surface or base 33 of cutting edge 104 but other orientations are possible.

Figure 5:
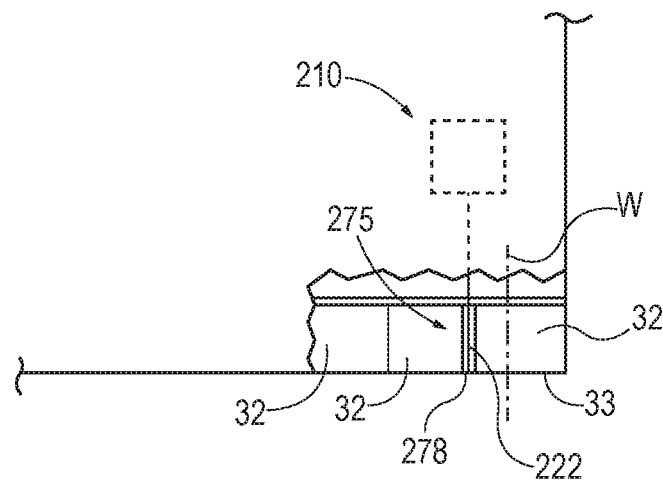
FIG. 5 is a schematic diagram of a monitoring system according to the disclosure.

In the example, second component 32 is a tungsten carbide insert 105 used in a plowing application. Several inserts may be arranged in a row to form a cutting edge of a plow 100. The inserts may be generally rectangular solids, as best shown in FIG. 5, that are located within a groove 34 in the steel support 31. More generally, the carbide insert is presented in a position to contact surface S and perform an operation O, such moving material M on a surface S as shown in FIG. 1. Carbide is often used because it offers exceptional wear properties resulting from its near diamond hardness. Carbide is an expensive material and in road maintenance applications, it is common for the carbide insert to represent 70% of the cost of the cutting edge 104. In addition, although extremely hard, carbide is prone to brittle fracture and consequently monitoring the health of the carbide during an operation is important.

Figure 3:
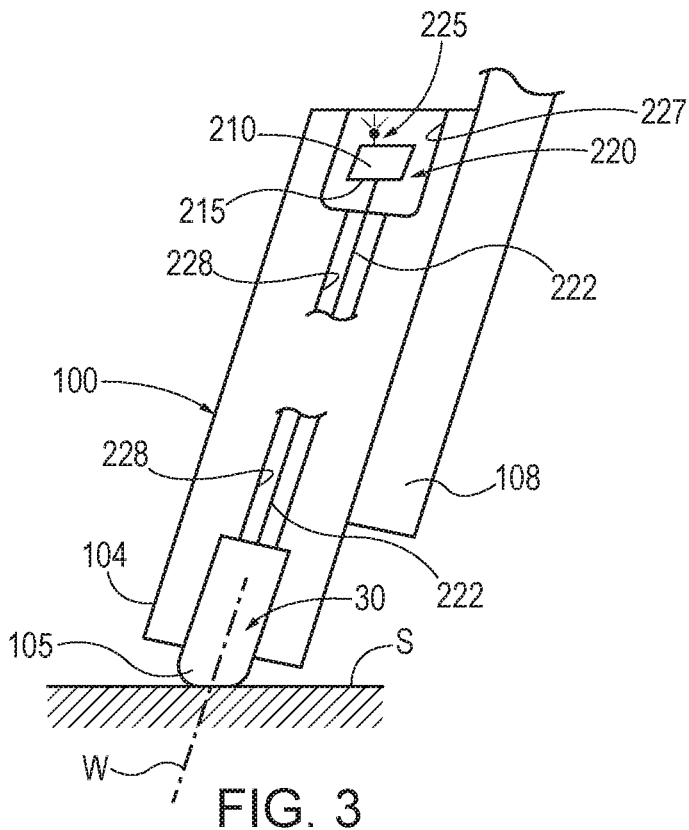
FIG. 3 is a partially schematic sectional view as might be seen along line 3-3 in FIG. 2 depicting further details of a monitoring system according to the disclosure.

As shown in FIG. 3, the carbide insert 105 is positioned to contact surface S. This contact abrades the carbide insert 105 such that it loses height at a gradual rate during operation of implement 20. The abrasive contact eventually wears the carbide insert 105 to a point where it is no longer effective in performing the operation or to a point where it is completely consumed. Wear lines and wear windows may be used to visually verify that the cutting edge has been worn past the useful height of the carbide. These visual indicators are not useful in real-time monitoring of cutting edge wear in that the operator has to exit the cab and be in a position to view the wear line or window. Moreover, the cutting edge must be free of material for proper viewing. During an operation, it is common for material to build up on the surface of the implement forcing the operator to exit the cab and clear this material to view the wear line. Moreover, because the carbide is sandwiched between layers of steel, the wear line may not provide a reliable indication of wear. Due to the brittle nature of the carbide, impacts with the cutting edge may cause fracture and loss of carbide insert material during the operation. Also, poor implement set up or uneven surfaces may cause irregular wear of the carbide or the cutting edge in general. Again, these irregularities prevent the wear line from being a reliableindicator of carbide wear. Wear lines have been used for over 10 years, and therefore, there is a long-felt and unresolved need for a monitoring system that can provide remote monitoring.

The present examples relate to a monitoring system generally indicated by the number 200. Monitoring system 200 includes a sensor 210 that monitors an aspect of an implement 20. Sensor 210 may include temperature, resistance, continuity/discontinuity, and acoustic sensors. Sensor 210 may further include accelerometers, velocity and position sensors. Sensor 210 may still further include load cells. Sensor 210 may include optical sensors such as laser, IR or UV sensors. These sensors 210 may be used alone or in combination to monitor a component 30 of an implement 20. For road maintenance and similar operations, wear components are of great interest since the mode of wear, wear rate, and need for replacement of these components is not readily understood. Using snow plows as an example, the wear component is the cutting edge of the plow. The cutting edge may include carbide inserts constructed of a tungsten carbide supported in a groove on the lower surface of the cutting edge. It is common for operators to replace cutting edges before the carbide has been completely used in some cases and in others the wear past the carbide and damage the plow. Once the carbide is spent, the cutting edge should be replaced. Therefore, it is desirable to more accurately monitor wear of the carbide insert to prevent premature replacement or damage to components from overuse. Since wear is uneven, it may be useful to employ a series of sensors along the cutting edge 104 to monitor any variance in the wear as well.

It will be understood that the sensors 210 described herein may be applied to monitor conditions other than wear, and therefore the described examples should not be considered limiting. In an example, a wear sensor 215 monitors wear of the cutting edge 104 and in particular wear of a carbide insert 32. The wear sensor 215 is placed in sensing communication with at least a portion of the cutting edge 104 to monitor a characteristic thereof, as will be described more completely below. The characteristic may be indicative of a condition where the cutting edge or component requires inspection, maintenance or replacement for continued use of the implement 20. For example, components or portions of the cutting edge that are doing work are prone to faster wear than portions that are not performing work. Likewise portions or components that contact the working surface or are in contact with debris or other material M being moved by the cutting edge 104 are subject to increased wear relative to those that are not similarly exposed to the work surface or other material moved by the cutting edge. Often these portions or components are made of hardened or more dense material to extend their useful life. These materials typically have a greater cost and in some instances once the material is expended, the implement is no longer useful or requires refurbishment or maintenance to extend its useful life.

Apart from the wear line, in the field, an operator often relies on sensory input including the feel of the implement or the noise generated by the implement. These subjective observations are not always the most reliable indicator of wear. It has been observed that operators may continue operation after the wear portion of the cutting edge has been expended resulting in increased wear or damage to the implement or other components. In other instances, operators will use their sensory input and conclude that replacement is needed when the component still has additional life. As a result, it is desirable to monitor the wear of these portions or components to obtain a more accurate understanding of the useful life or when a component requires further monitoring, repair/replacement or other maintenance. It will be understood that the monitoring system 200 described herein may be used with any of the implements described above and other earth moving or milling equipment. For purposes of example, a road maintenance operation will be discussed. This example is not limiting.

ROAD MAINTENANCE VEHICLE EXAMPLE

Using road maintenance vehicles as an example, the cutting edge 104 may be mounted on a support that allows it to interact with a surface S for purposes of grooming, raking, clearing, plowing or otherwise moving material M on the surface or forming part of the surface S. While examples of road maintenance operations abound and have been described above, one operation, namely, snow plowing will be discussed herein. It will be understood that the principals relating to plowing translate to other road maintenance operations and other applications such as earth moving or milling.

With reference to FIG. 1, a snow plowing or other road maintenance operation involving moving of material M from a surface generally includes an implement 20 that engages the surface S for purposes of pushing, dragging, raking, wiping, or milling the surface S. In these instances, implement 20 may include a plow 100 that may be attached to a vehicle 10 or trailer coupled to the vehicle 10. These plows are often categorized by the location of their attachment, such as a front plow, underbody plow, wing (side) plow, or tow plow. Exemplary front plow configurations include bottom trip, trip plow, one-way, section trip, slide trip, V-plow, or folding V-plow configurations ranging from 8 to 32 feet in blade length. Exemplary underbody plow configurations include high speed hinged, folding moldboard, fixed, or reversible configurations ranging from 9 to 14 feet in blade length. Exemplary wing plow configurations include patrol wing, benching leveling wing, mid mount wing, front mount wing, extendable mid mount wing, or rear mount wing configurations ranging from 6 to 14 feet in blade length. The cutting edge may also be used with a variety of tow plow configurations ranging from 5 to 32 feet in blade length.

A plow 100 of the present application generally comprises a moldboard, and adapter blade attached to the moldboard, and a cutting edge removably attached to the adapter blade. However, in certain embodiments, various other members may be used to attach the cutting edge to the moldboard or the cutting edge of the present application may be attached directly to the moldboard.

Figure 2:
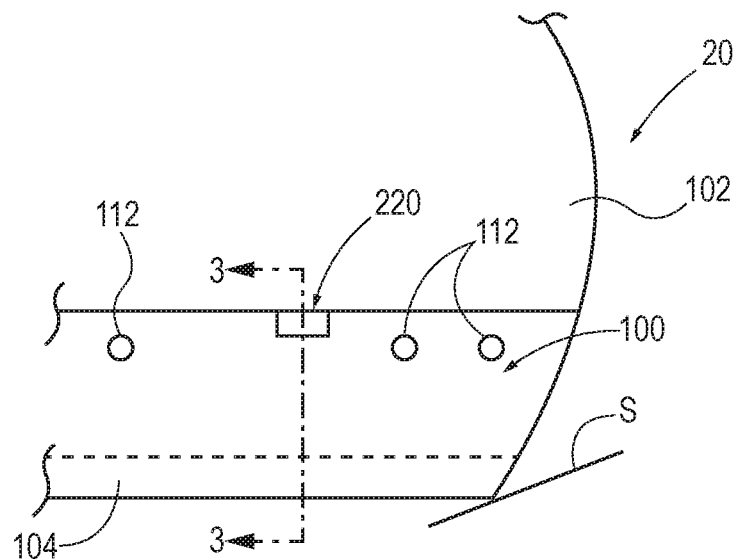
FIG. 2 is a partially schematic enlarged view of a cutting edge having a monitoring system according to the disclosure.

FIGS. 1 and 2 illustrate an exemplary plow 100 according to an embodiment of the present application. The plow 100 comprises a moldboard 102 and a cutting edge 104 removably attached to the moldboard. As shown, the moldboard 102 includes a curved, concave portion for directing snow or other material M up and away from the surface S. A lower portion of the moldboard 102 includes spaced openings 106 for attachment of the cutting edge 104 to the moldboard. In certain embodiments, the spaced openings 106 of the moldboard 102 are disposed in a separate member attached to a lower edge of the curved portion, such as a backer plate, adaptor or other member.

As illustrated in FIG. 1, an adapter blade 108 is used to attach the cutting edge 104 to the moldboard 102. As shown, the adapter blade 108 comprises spaced openings 110 that substantially align with the spaced openings 106 in the moldboard 102 and fasteners 112 are used to removably attach the adapter blade to the moldboard. The layout of the spaced openings 106 in the moldboard 102 and the pattern of spaced openings 110 in the cutting edge 104 shown in the Figures is commonly referred to as a 3"-3"-12" layout. However, it should be noted that the layout shown is merely exemplary and the blade may be configured for use with a variety of punch layouts, including 2"-8"-8", 4"-8"-8", or any other layout to fit any plow configuration.

The cutting edge 104 comprises spaced openings that substantially align with spaced openings 110 of the adapter blade 108. The layout of the spaced openings in the cutting edge 104 and the spaced openings 110 in the adapter blade shown in the Figures is commonly referred to as a 3"-3"-12" layout. However, it should be noted that the cutting edge 104 and adapter blade 108 configurations shown are merely exemplary and the cutting edge may be configured for use with a variety of punch layouts, including 6"-12"-12", 6"-12"-12", 2"-8"-8", 4"-8"-8", or any other layout to fit any plow configuration.

Threaded bolts (e.g., carriage bolts), washers and nuts may be used to fasten the cutting edge 104 to the adapter blade 108 and the adapter blade to the moldboard 102. However, a variety of other suitable fasteners may be used, such as for example, pins, studs, posts, or the like. For example, in one embodiment, the mounting member comprises posts or studs (e.g., threaded posts or studs) extending from a longitudinal surface of the elongate member. In this embodiment, it is contemplated that one end of the posts or studs may be welded or otherwise affixed to the mounting member. The projecting end of the posts or studs is inserted through the spaced openings 114 in the cutting edge 104 and the spaced openings 110 in the adapter blade 108 to attach the cutting edge to the adapter blade. A nut may be used with each post or stud to fasten the cutting edge 104 to the adapter blade 108.

The adapter blade 108 may comprise one or more stops extending outward from the face of the adapter blade and positioned above the cutting edge 104. The stops may be integrally formed with the adapter blade 108 or attached to the adapter blade in a variety ways, such as with fasteners or a weld. If the cutting edge 104 is forced or otherwise moved upward relative to the adapter blade 108 a certain distance, the top edge 132 of the cutting edge 104 contacts the one or more of the stops 130 to prohibit any further upward movement of the cutting edge relative to adapter blade. As such, the stops 130 prohibit over travel of the blade segments and over compression of the elastomeric material that may damage the cutting edge 104. The stops are positioned a distance above the top edge of the cutting edge 104. The distance is generally between about ½ inch and about 1 ½ inch. In certain embodiments, the distance is about 1 inch.

Further, the adapter blade 108 acts as a secondary or backup blade for the plow 100. For example, should the cutting edge 104 become damaged (e.g., one or more blade segments are removed) and/or is worn down, the cutting edge of the adapter blade 108 is exposed and will scrape along the roadway to remove snow or other materials from the roadway.

The cutting edge 104 may be formed as a single elongate member positioned between the adapter blade 108 and the mounting member. However, in other embodiments, the cutting edge 104 may be divided into a plurality of segments (e.g., 6, 10, 12, 36 or 48 inch segments) that are positioned end to end along the length of the adapter blade 108 or moldboard 102. These segments may or may not be sized to the length of the individual blade segments. Further, gaps may exist between two or more cutting edge segments such that the cutting edge is not contiguous. Further still, two or more of the cutting edge segments may be removably attached together, such as for example, with a tongue/groove connection, male/female connection, straps, buckles, pins, screws, bolts, Velcro®, or other fastener. Further, one or more cutting edge segments may comprise male and/or female parts to facilitate proper alignment of the cutting edge with the adapter blade 108.

One exemplary method of installing a cutting edge to a plow moldboard includes utilizing an adapter blade having one or more first openings and one or more second openings. The one or more first openings of the adapter blade are aligned with one or more openings of a moldboard. One or more first fasteners are inserted through the one or more first openings of the adapter blade and the one or more openings in the moldboard to attach the adapter blade 108 to the moldboard 102.

In one example, a cutting edge 104 is supported on adapter blade, and in other examples, the cutting edge 104 mounts directly to the moldboard 102. As discussed, cutting edge 104 may comprise plural segments 35. Cutting edge 104 may be rigid, flexible, or a hybrid component with rigid and flexible elements. For example, cutting edge 104 may include an elastomeric portion that at least partially surrounds the one or more blade segments and permits the one or more blade segments to move independently when the cutting edge is attached to the adapter blade. An example of this is provided in U.S. Pat. No. 8,984,778, which is incorporated herein by reference. In other examples, cutting edge may be supported via bolts that pass through an elastomeric component to provide a degree of independent movement for the entire cutting edge section. One example of such a system is described and shown in U.S. Pat. No. 9,290,898, which is incorporated herein by reference. In these examples, the ability of the cutting edge or portion thereof to move independently helps absorb shock, reduce vibration and noise.

In other examples, the cutting edge 104 is not suspended as in rigid plow blades or scarifier boards that bolt directly to the moldboard 102 or an adaptor blade 108.

As discussed, depending on the application, cutting edge 104 may have a variety of shapes or configurations including but not limited to a linear configuration that is uninterrupted or spaced. Other configurations including curved, V-shaped, or irregular profiles may also be created. In some examples, the cutting edge 104 includes one or more blade segments 35 that are arranged within the cutting edge. These blade segments 35, likewise, may have a variety of sizes, configurations and shapes. For example, the blade segments may comprise one or more curved, arcuate, or straight edges forming a variety of shapes, including, but not limited to, circular, rectangular, oval, elliptical, square, triangular, polygon and hour glass shapes.

The cutting edge 104 and/or blade segments 35 may be constructed of a variety of materials including metals, carbon materials, ceramics, polymeric materials and combinations thereof according to the examples herein. Depending on the application other materials may be incorporated such as wood or other natural materials, fiberglass, and other glass products and combinations thereof. In the example shown in FIG. 1, the cutting edge includes a support 31, such as a steel body that supports plural carbide inserts 32 in a row along the lower edge or base 33 of the body. The dimensions of the cutting edge 104 also may vary depending on their application or the imagination of the designer. Further, the overall size of the cutting edge 104 may vary depending on the plow or plowing system. For example, in certain embodiments, the cutting edge is about ⅞ inch thick, about 6 inches in height, and provided in either 3 or 4 foot long sections. The length of the sections may vary depending on the types of materials used. In the particular example, cutting edges 104 constructed of steel with carbide inserts have a weight that is manageable by most operators allowing them to remove and remount segments on a mold board without overexertion. Cutting edges constructed of lighter materials, may be formed in longer lengths.

As mentioned, cutting edge may include inserts along a lower surface. The inserts may be constructed of any material suited for a given application including but not limited to metal, ceramic, rubber, cork, wood, natural and unnatural fibers, natural and synthetic gemstone, polymeric materials and combinations thereof. The inserts may be selected on any number of criteria including but not limited to facilitating longer wear or to accommodate different types of working surfaces. To support inserts, cutting edge body may include a milled groove 34 (FIG. 5A) in base 33 to receive an insert 32. Insert 32 may be selected from metal, ceramic or polymer materials. In highly abrasive applications, such as snowplowing or other road maintenance, it may be desirable to use an insert with a high degree of hardness to increase the wear life of the cutting edge. Other applications may not require this level of hardness and lighter duty, more ductile or flexible inserts may be used.

Using road maintenance as an example, for snowplowing on paved roads where the plow experiences a high degree of abrasion often at significant speeds, the insert may be constructed of tungsten carbide or functional equivalent material, such as WC grade tungsten carbide grade K3030C. Certain tungsten carbide inserts have a cobalt content between about 11 and 12.5%, a density between about 14.1 minimum and 14.6 maximum, a hardness between about 87.5 and 89 Rockwell A, and a transverse rupture strength of about 350,000 psi. The physical properties of this insert help it resist abrasive wear and extend its useful life.

In other applications, this level of hardness is not necessary. For example, light duty plowing, debris removal or earth moving may be performed with standard steels, high density polyethylene (HDPE) or other polymers with or without reinforcement, rubber, urethane and other elastomeric materials, ceramics and combinations thereof. In some applications, such as when there is a great deal of surface irregularity, it may be desirable to use a material that is somewhat flexible or has a lesser hardness to prevent it from scratching or marring the surface. In these applications, rubber or other elastomeric materials may be selected as an insert or form the entire cutting edge.

Exemplary elastomeric materials include, but are not limited to, rubber, plastic or polyurethane materials that do not corrode in the presence of salt and water and are compatible with steel. Further, the properties of the elastomeric material and the overall thickness of the cutting edge may vary between embodiments and/or be tuned to a specific implement. For example, the hardness, stiffness, thickness, and/or density of the elastomeric material may vary based on the size, type, and/or configuration of the implement or cutting edge.

In certain examples, the elastomeric material comprises a polyurethane material having a hardness between about 75 and 96 Durometer A and a density between about 1038 and 1235 kg/m³. In one particular embodiment, the elastomeric material comprises a polyurethane material having a hardness of about 85 Durometer A and a density of about 1163 kg/m³. Further, the polyurethane material may have an ultimate elongation of about 650%, a secant modulus of about 300% at 900 psi, a tensile strength of about 5500 psi, a tear strength (die C) of about 400 pli, a compression set of about 35%, and a bayshore rebound of about 30%.

In other examples, the elastomeric material comprises a rubber compound having a hardness between about 50 and 80 Durometer A and a density between about 1107 and 1301 kg/m³. In one particular embodiment, the elastomeric material comprises a rubber compound having a hardness of about 67 Durometer A and a density of about 1160 kg/m³.

The elastomeric material of the present application may also comprise one or more materials joined or otherwise secured together to form the cutting edge. For example, one or more portions of the elastomeric material may comprise a first material that is different than a second material found in one or more other portions of the elastomeric material. The type, hardness, stiffness, thickness, and/or density of the first material may be different than the second material. Different types of materials include, for example, various types of polyurethane, rubber or plastic.

The monitoring system 200 of the present application is intended to be universal in that it may be configured for use with any implement 20 used to perform surface operations O. As noted, the sensor 210 is placed in sensing communication with a portion or component of the cutting edge 104 that is to be monitored. Sensor 210 may form part of a sensor assembly 220 that is mounted on or near the cutting edge 104 to perform the sensing operation. With reference to FIG. 3, one example is shown where sensor assembly 220 is embedded within cutting edge 104 to monitor an insert 105, such as a tungsten carbide insert.

In this example, sensor assembly 220 includes a lead 222 that extends from sensor housing 212 to establish sensing communication with component. Lead 222 may have a first portion housed in a sensor housing 212 and appropriately sealed based on the type of application and mounting location for sensor housing 212. A second portion extends outward from housing 212 into sensing communication with the component 30 that is being monitored by system 200. Sensing communication may be established through physical contact, electric, magnetic, sonic, light or other non-contact communication or combinations thereof.

For example, when monitoring the wear characteristics and health of a carbide insert 105, Sensor 220 may monitor temperature, heat, or resistance via lead 222 as described herein, or lead 222 may be used as a continuity/discontinuity sensor. For temperature measurement, lead 222 may include a thermocouple, thermistor or other suitable sensor. In another example, the resistance in lead 222 may be measured by sensor 210 to determine wear as a function of temperature. In this example, as wear of carbide approaches a lead 222, the heat transfer from friction increases the temperature of the lead 222 causing its resistivity to change in proportion to the temperature. In another example, lead 222 may be sacrificial and extend adjacent to the carbide such that changes in the length of the lead 222 result in a change in resistivity allowing monitoring of real-time wear as the lead 222 wears with the carbide. In another example, lead 222 may be a fiber optic lead that may continually calculate the distance between the end of the lead and the surface to measure wear (i.e. the change in height) in real time.

Figure 6:
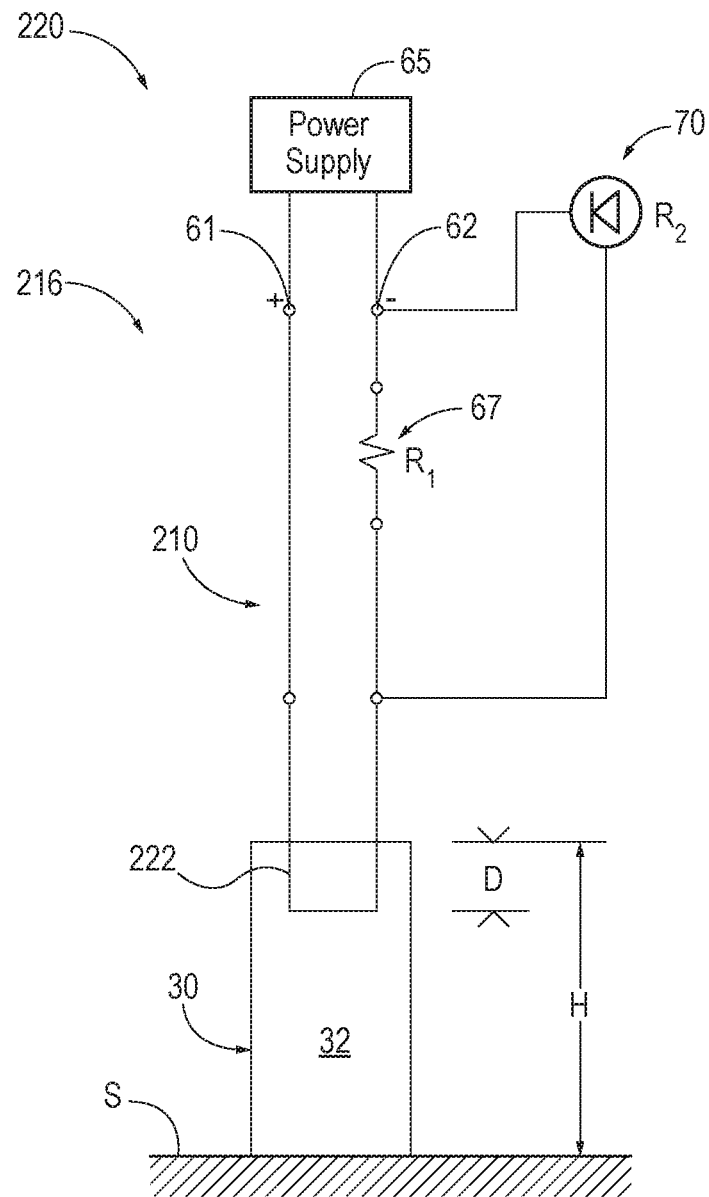
FIG. 6 is a circuit diagram of an example monitoring system according to the disclosure.

In another example, sensor 210 is a continuity sensor where lead 222 forms a circuit that once broken indicates that wear has reached a threshold indicated by the position of the lead 222. Multiple leads may extend to different depths D to progressively monitor the wear as each lead is successively broken. For example, parallel conductive lines may be separated by known distances to determine progress of wear. With reference to FIG. 6, an example continuity arrangement of sensor assembly 220 is shown. There, sensor 210 includes a lead 222 that extends to a depth D within a carbide insert 105. In the example, this depth is less than a quarter of the height H of insert 105. At this depth, a break in lead 222 would indicate that the carbide insert 105 has worn to a point where it is no longer useful. It will be understood that other depths D may be used to monitor wear to different heights within carbide insert 105 or multiple leads may be used to provide multiple wear data points in a continuity sensing arrangement.

With continued reference to FIG. 6, a break in lead 222 caused by wear of carbide insert 105 is of interest. To that end, sensor assembly 220 may include a circuit, generally indicated at 216 that alerts an operator to the presence of a discontinuity or break in lead 222. In the example, lead 222 is connected to a first terminal 61 and a second terminal 62 of a power supply 65 to form a complete circuit. A first resister 67 is connected in series with lead 222. First resistor 67 has a known resistance R1. A discontinuity output 70 is connected to second terminal 62 in parallel with lead 222. The resistance R2 of discontinuity output 70 is selected such that it is greater than the resistance R1 of resistor 67. Under normal conditions where lead 222 is not broken, the resistance R2 created by discontinuity output 70 is greater than the resistance R1 in the rest of the circuit 216. As a result, current flows through first resistor 67 rather than through discontinuity output 70. When lead 222 is broken, the resistance within the series circuit becomes greater than resistance R2 causing current to flow through discontinuity output 70 to generate an alert A for the operator. An alert A may be any output signal including but not limited to a audible, visual or haptic output. For example, the alert A may simply include a light, tone, or vibration that is generated to indicate a break in the continuity. More involved alerts A may be used for different outputs described below.

In the example shown, output 70 is an LED, and thus, when lead 222 is broken, the current lights the LED to provide an alert A to the operator that the carbide 32 has worn to the wear sensor lead 222. It will be understood that other alerts may be used including visual, audible or haptic devices that directly alert the operator. The output 70 may also generate a signal that is transmitted to monitor controller 250 such that an alert signal is provided remotely from sensor 210 as discussed more completely below.

As shown in FIG. 1, plural sensors 210 may be provided along the length of the cutting edge 104 to monitor multiple locations. In this way, differences in sensed information may be identified and may indicate uneven wear, improper implement setup, or other conditions that need to be addressed or monitored more closely by the operator. In the example shown, a sensor assembly 220 is provided on each cutting edge segment 35 such that the operator or other person monitoring the implement 20 receives feedback about each segment. This allows the segments to be replaced individually when one segment experiences different wear or incurs damage causing a loss of carbide or other event necessitating repair or replacement as indicated by monitoring system 200.

With reference to FIG. 5, sensor assembly 220 may include a sensor communicator 225 that includes at least a transmitter that communicates a signal 230 to a monitoring controller 250. Sensor communicator 225 may optionally include a receiver in addition to transmitter or simply a combined transmitter/receiver i.e. a transceiver to allow two-way communication of signal 230.

Monitoring system 210 further includes a monitoring controller 250. Monitor controller 250 is located remotely relative to sensor assembly 220, and configured to receive a signal 230 from sensor assembly 220. To that end, monitor controller 250 includes a monitor communicator 255 that communicates with sensor communicator 225. Monitor communicator 255 includes at least a receiver to receive a signal 230 from sensor assembly 220. Monitor communicator 255 may optionally include a transmitter in addition to receiver or simply a combined transmitter/receiver i.e. a transceiver to allow two-way communication of signal 230.

The communicator 255 may be wired or wireless. For a wireless connection, it may operate on various wireless protocols including but not limited to WIFI, WIMAX, BLUETOOTH, infrared, IRDA, NFC, RF, ZIGBEE, cellular, and the like.

Monitor controller 250 may generally include an input 251, output 252, a processor 254, and a memory 256 and a power supply 258. Input 251 and output 252 may be combined in a touch screen display 253, as shown, or other suitable configuration may be used. To protect, monitor controller 250 from the elements and other debris created by the implement, it may be remote from the cutting edge 104 or provided in a suitable housing on implement 20. Monitor controller 250 may be mounted within the cab 15 of a vehicle 10 on which the implement 20 and cutting edge 104 are mounted. Monitor controller 250 may also be provided in a portable housing 260 that can be carried by the vehicle's operator. Thus, to obtain readings from sensor 210, monitor controller 250 may receive a signal 230 from sensor assembly 220. Signal 230 may provide heat, temperature, continuity/discontinuity or other sensed information to the controller 250. In examples, where multiple sensors 210 are used, the signal 230 may carry plural sensor readings that can be processed by controller 250 to obtain additional information based on comparisons of these readings or other operations involving the data obtained in the signal 230 from each sensor 210.

Road maintenance applications typically involve extended periods of steady state abrasion in grading, plowing, raking, earth moving and milling applications. Due to these conditions, it is common for highly durable materials with extended wear properties to be used. As mentioned, tungsten carbide inserts are commonly used for surface engagement. Other components may be coated with high hardness materials such as Ni-hard, hard facing weld wire or coatings containing hard metal or carbide particles. The hardness of these materials may be prohibitive in terms of inserting a lead within the material as they require special manufacturing techniques. Moreover, given their hardness it is difficult to machine these materials to pot a sensor lead therein. While difficult, these options are possible.

Figure 3A:
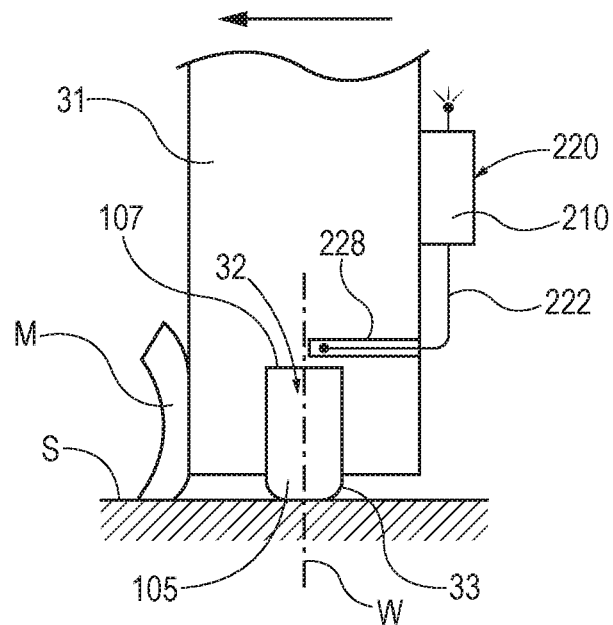
FIG. 3A is a view of depicting details of a monitoring system according to the disclosure.
Figure 4:
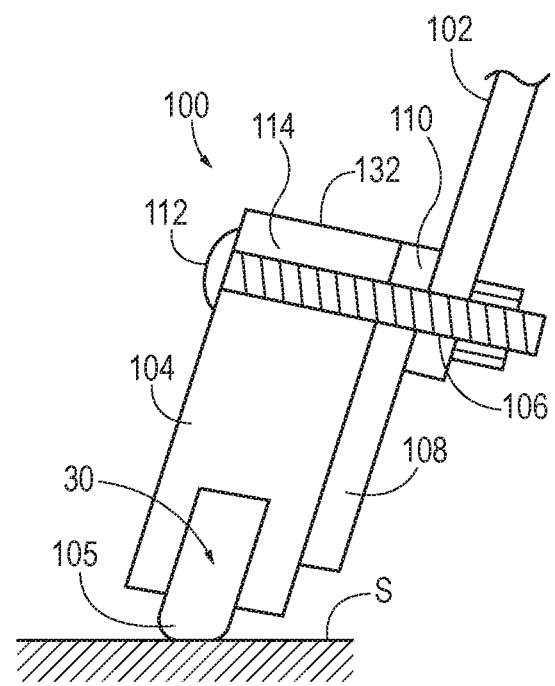
FIG. 4 is a partially schematic sectional view as might be seen along line 4-4 in FIG. 1 depicting further details of an implement.

When not embedding the sensor 210 or lead 222 within a component, sensor 210 or lead 222 may be configured for non-contact sensing, as shown in FIGS. 3 and 3A. There, lead 222 is located adjacent to the monitored component 32. For example, lead 222 may terminate near the top edge of a carbide insert 105. To that end, support 31 may be provided with a channel that receives lead 222 and connects it to sensor housing 212. In this example, a non-contact sensor 210 may be used to monitor conditions that do not require contact with carbide insert 105. For example, for monitoring the health of the carbide insert 105, a temperature sensor may monitor heat, temperatue, conductivity, resistance, magnetic fields or other characteristics near carbide insert 105 may be used to identify the progress of wear, fracture, or other damage to the insert 105. According to the example shown in FIGS. 3 and 3A, as the carbide wears, insert 105 is shortened along with the steel that surrounds it. The cutting edge scraping the surface S generates heat. As wear progresses toward the sensor lead 222, the source of heat moves closer to lead 222 causing a proportionate increase in temperature. The temperature change itself may be sensed by a temperature or heat sensor, such as a thermistor or other examples described above. Alternatively, the change in temperature may be sensed as a change in conductivity/resistance in the lead 222. The lead 222 may be configured such that an electrical current is passed through lead continuously and voltage monitored to detect changes in the resistance according to Ohm's law. The example also is configured as a discontinuity sensor in the sense that when wear progresses to the point that the carbide insert 105 is spent, the wear will cut the circuit created by the lead 222. The lack of continuity or discontinuity signals that the carbide insert 105 has been worn past its useful life or that the insert 105.

As depicted in FIG. 3, sensor assembly 220 may be housed at least partially within cutting edge 104. In the example, a recess 227 may be formed in cutting edge 104 to house at least a portion of sensor 210 and a channel 228 is provided for lead 222. In this example, channel 228 extends downward generally along a central axis of cutting edge 104 that corresponds to the wear axis W of insert 105. It will be understood that channel 228 may follow different routes to place sensor 210 in sensing communication with a component. For example, as shown in FIG. 3A, channel 228 may extend generally perpendicular to the wear axis W and still locate a sensor lead 222 adjacent to carbide insert 105. In the two examples shown, lead 222 is placed near the top edge 107 of carbide insert 105 since this is the last portion of the insert 105 that will experience wear before the carbide insert 105 is spent. As discussed, this allows sensor 210 to monitor wear during use and/or monitor ultimate wear as a continuity sensor that is broken when the insert 105 is worn out to the point of breaking the circuit created by lead 222.

FIG. 3A also shows an example of mounting a sensor assembly 220 external to the cutting edge 104. In the example, cutting edge 104 has a front side 101 and a back side. The front side is the side generally used for moving material M when the vehicle 10 is moving forward. The rear side is opposite the front side. Either side may be used to move material, such as use of the back side during a back drag or similar backward moving operation. For a plowing application as shown, the front side is typically used more often than the back side and greater speeds are experienced during forward movement of the plow. In the example, the sensor housing 212 is located on the back side of cutting edge 104 to offer some protection from material M during an operation O. Lead 222 may extend downward from housing 212 and extend into support 31 via a channel 228 as discussed above. In the example, channel 228 extends generally perpendicular to the wear axis W of carbide insert 105 and above the upper surface 107 of carbide insert 105 to create sensing communication near the upper extremity of carbide insert 105.

Figure 5A:
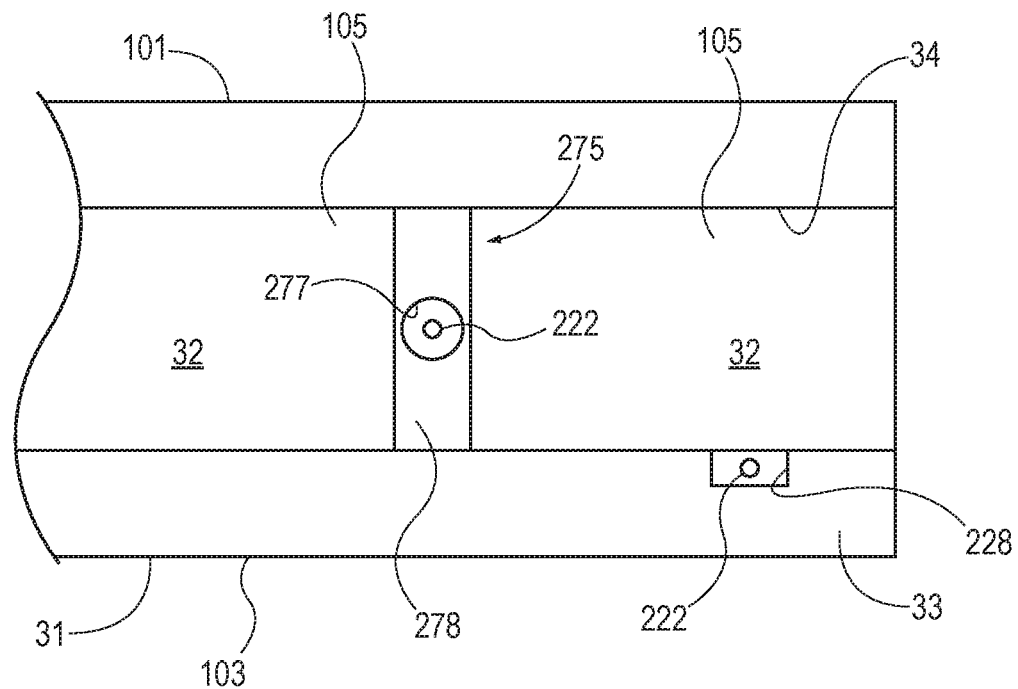
FIG. 5A is a bottom view of a cutting edge having a monitoring system according to the disclosure.

According to another example, however, a lead 222 may be located adjacent to the component that is being monitored and positioned such that it lies contiguously with the wear component. For example, with reference to FIG. 5, a lead 222 may be located adjacent to a carbide insert 105 and extend parallel to the carbide insert 105. In this example, lead 222 is placed within a shim 275 as discussed more completely below. As depicted in FIG. 5A, channel 228 may be formed within a support 31 adjacent to carbide insert 105. This channel 228 may open into groove 34 or be closed from it. Channel 228 houses lead 222 such that it is exposed to the same wear as the carbide insert 105. In some instances, the lead 222 may contact a surface of the carbide insert 105 for contact sensing. More generally, a channel 228 may be provided adjacent to the component 30 to place the lead alongside the component 30. Channel 228 may be oriented normal to surface S or aligned with the component 30 to allow it to wear at the same time as component 30. In other examples, lead 222 may be distal from component within a channel that opens into the groove 34 or recess in which an insert or other component to be monitored is mounted.

In FIG. 5, lead 222 is embedded within a shim 275. Shim 275 may be inserted between, coated onto or otherwise placed to adjacent carbide inserts 105 as shown. Shim 275 may be constructed of any material including but not limited to natural materials; polymers; metals; ceramics or combinations thereof. Shim 275 may be selected from a material having a hardness equal to or less than the hardness of the component 30 being monitored for wear. In this way, the shim 275 will generally wear in a similar fashion to the component i.e. by not wearing at a slower rate than the monitored component 30. For example, in the tungsten carbide insert 105 example, shim 275 may be constructed of a similar material to have the same hardness as the insert or a material with a hardness less than the tungsten carbide. Shim 275 may be held between carbide segments as shown by close tolerances between adjacent inserts or attached by a separate fastener including but not limited to a mechanical fastener, such as a screw, clip or the like; chemical fastener, such as an adhesive, epoxy or other binder; or a weld, solder or braze material.

Shim 275 may define a channel 277 in which the lead 222 is inserted. As shown, channel 277 may extend normal to a base 278 of shim 275. The base 278 of shim 275 is located near the base 33 of insert 105 causing the opening 277 to run parallel to the wear axis W of carbide insert 105. With the lead 222 mounted within opening 277, lead 222 also extends parallel to the wear axis W of carbide insert 105. In this way, lead 222 experiences the same flexibility in terms of its placement.

Figure 5B:
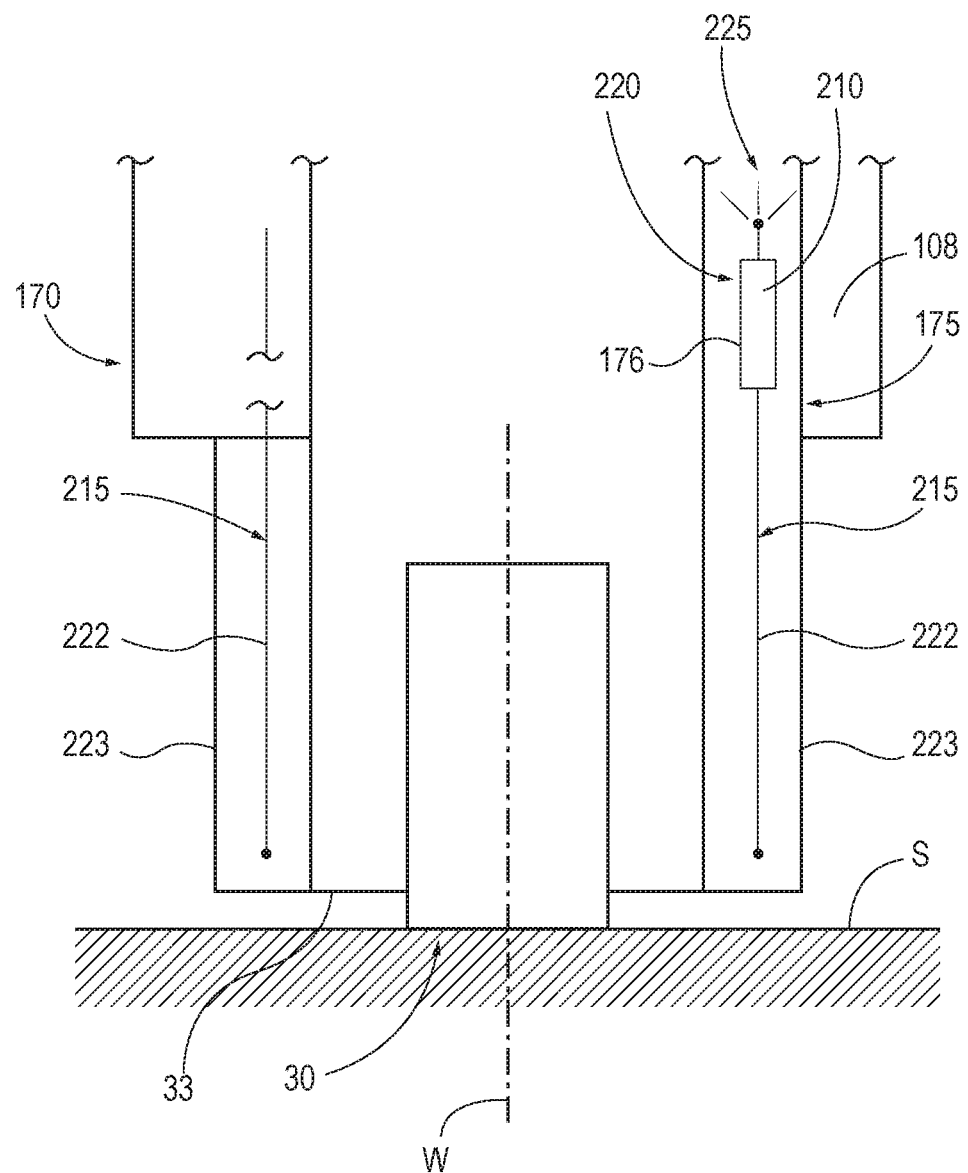
FIG. 5B is a view of depicting details of a monitoring system according to the disclosure.

With reference to FIG. 5A, an example showing placement of sensor lead 222 adjacent to component 30 is shown. In this example, sensor lead 222 is affixed to the support 31 adjacent to the component rather than within or between components 30 as described above. Here, a channel 228 may be defined in support 31 to house lead 222 or lead 222 may be attached to support 31. In the example shown, channel 228 extends parallel to a surface of carbide insert 105. The channel 228 is defined at an edge of groove 34 in which carbide insert 105 is received placing lead 222 directly adjacent to carbide. Lead 222 may be loosely mounted within channel 228 or secured with a suitable adhesive. Lead 222 extends generally parallel to carbide insert 105 as in the shim example and also to the same depth such that the sensor lead 222 extends to the base 33 of support 31. With this depth D, lead 222 is capable of monitoring wear of support 31 and carbide insert 105 in real time since it will experience the same wear as those components. In this example, sensor 210 may rely on the change in resistance as the lead 222 is consumed to provide such real time feedback as previously discussed Relatedly, sensor lead 222 may be placed adjacent to the component 30 by mounting lead within a sheath or separate housing that is attached to or supported adjacent to the component. The lead sheath 223 may be constructed of a sacrificial material when lead runs parallel to the component in a wear context. As shown in FIG. 5B, lead 222 may be supported in sheath adjacent to component 30 to monitor the wear on component 30 through the various means described above. In the example, sheath 223 is supported along the back side of cutting edge 104 and generally extends parallel to wear axis W. Sheath 223 may be attached to cutting edge 104 by a fastener including mechanical fasteners, chemical fasteners, a weld or combinations thereof. The sheath 223 may be a separate component or incorporated within a component within the implement 20. Using the plow example shown, it is common to use a cover plate or a backer on either side of the cutting edge 104. Either component may incorporate a sheath that places lead 222 adjacent to the carbide insert 105 of the cutting edge to monitor its wear. FIG. 5B shows two possible cutting edge assemblies incorporating a sheath into these components. In the example, sheath is shown in one instance attached to a cover plate 170 on the front of plow 100. In another instance, sheath 223 is formed as part of a polymeric backer 175 that provides shock absorption as described in U.S. Pat. 9,290,898. Here, sensor assembly 220 is molded into polymeric backer material and sheath 223 is formed integrally with the polymeric material extending downward toward the base 33 of cutting edge 104. In addition to conveniently attaching the sensor assembly 220 to the plow 100, placement of the sensor assembly 220 within backer is believed to help protect the sensor assembly 220 during operating conditions by sealing it within a polymer matrix 176.

Regardless of the sensor configuration, output of the sensed component may be transmitted to a monitor controller, generally indicated at 250, by wired or wireless communication. Monitor controller 250 may simply provide an alert A when the sensed condition exceeds a selected threshold, is outside of a selected range or when damage to a component is sensed. Alternatively, monitor controller 250 may analyze data from sensor(s) 210 and provide an alert A the includes additional outputs as discussed herein.

According to one example (FIG. 1), monitor controller 250 may be located within the cab 15 of the vehicle 10 so that the operator may receive feedback from the sensor 210 during operation of the cutting edge 104. To that end, monitor controller 250 may include a display 253 (FIG. 7) that provides a graphic user interface acting both as input 251 and output 252. The display 253 may present information based on the signal 230 from sensor 210. The display 253 may include graphic, alphanumeric, and other visual content. Monitor controller 250 may also include an audible or haptic output 252. For example, a speaker 257 may be provided to provide audio information including but not limited to chimes, spoken information, and the like. Or, speaker 257 may be used to generate haptic output such as a vibration. The output from monitor controller 250 may be used to alert an operator when the monitored component 30 is nearing the end of its useful life or if the component 30 is working improperly or is damaged. Additional information including real-time monitoring information may be provided as well. In the example shown, sensor 210 monitors wear of a carbide insert 105 using a continuous measurement that provides real-time data via signal 230 of the wear-life of the carbide insert 105. The sensor signal 230 may be processed by processor 256 to display an alert A in the form of a graphical wear indication such as the bar graph shown or an alphanumeric indicato such as the percentage shown. As depicted, bar chart may be used to show wear levels from multiple sensors 210 communicating with monitor controller 250. In the example, the operator would see that uneven wear is occurring across the width of the plow 20 as depicted by the unequal bars in the chart.

Optionally monitoring system 200 may include a monitoring controller 250C located outside of the vehicle 10. This controller may be at any location where it is desirable to monitor road maintenance components including but not limited to a maintenance station, garage, procurement office, supplier office, or manufacturer location, generally indicated by the number 17. The monitor controller 250 may receive a signal 230 directly from sensor 210 or alternatively, each monitor controller 250 within a vehicle 10 may report to monitor controller 250C at another location 17 via a monitor signal 240. For example, a central monitor controller 250C may receive monitor signals 2401-n from one or more monitor controllers 250 located in vehicles 10.

Figure 7:
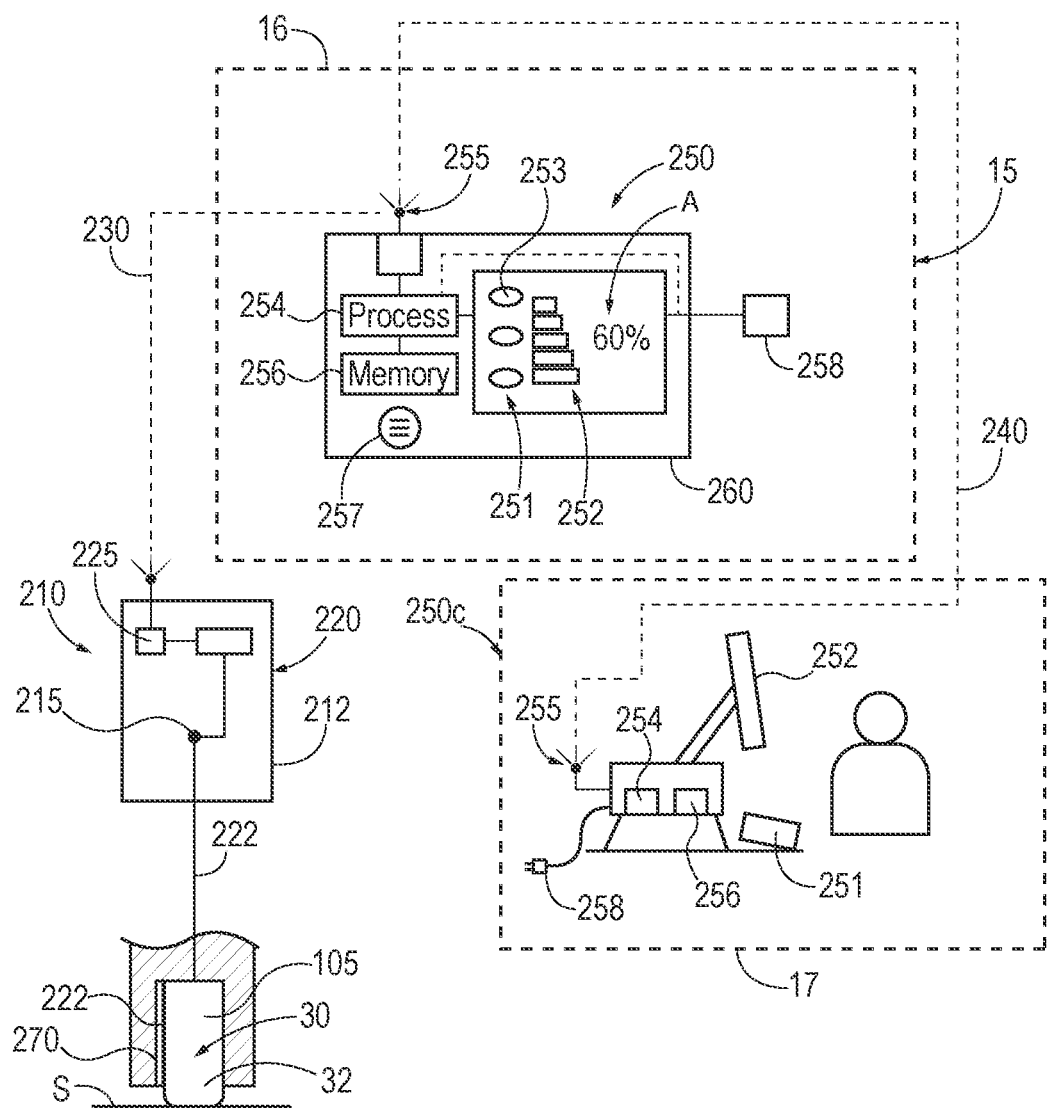
FIG. 7 is a diagram depicting a monitoring system having vehicle and remote monitoring.

As mentioned, a variety of sensors 210 may be used to monitor a component 30 within a road maintenance implement. With reference to FIG. 7, sensor 210 may include a temperature sensor, resistance sensor, electromagnetic sensor, continuity/discontinuity sensor, an inductance sensor, Hall effect sensor, acoustic sensor, accelerometer, velocity sensor, position sensor, Hobbs meter, load cell, laser sensors, optic sensor or combinations thereof. As discussed above, a temperature sensor, resistance sensor, electromagnetic sensor, inductance, optical or continuity/discontinuity sensor may be configured to monitor the wear on a component 30.

An acoustic sensor may be placed in proximity to the component 30 to monitor noise created by the component 30. This information may be used to monitor wear or damage to the component since variations in the acoustic waveform may result from wear of the material or a disruption or lack of noise may signal that the component has been struck by something or broken loose. Using the plow example again, due to its hardness, carbide is susceptible to brittle fracture and it is common for plows to strike objects in roads including but not limited to expansion joints, manhole covers, broken pavement, and road debris. These strikes can fracture the carbide causing an insert to partially break away or fall out of the cutting edge entirely. In this instance, the noise generated in the region of the broken insert will change based on the impact and, if the carbide breaks or falls out, based on the change in contact with the road surface.

Similarly, an accelerometer may be used to detect jolt in the implement or one or more components of the implement indicative of an impact. For example, with heavy road maintenance equipment and the considerable cabin noise associated with this equipment, the operator may not always hear or feel an impact that has the potential to damage a component. A position sensor, velocity sensor or accelerometer positioned near the component, however, may detect an acceleration or deceleration and send a signal 230 to alert the operator of the impact. These sensors may also be used to evaluate use of the implement, operator technique and path optimization.

A Hobbs meter measures operating hours and may be used to evaluate operating times for the component, implement and/or vehicle. Load cells may be position on the implement to determine loads placed on components or evaluate loading during operation. In one example, load cells may be used to evaluate implement set up by determining whether the load on a component is at, above or below a selected threshold. The load cell may be temporarily connected to the implement or placed under a component such as the base of cutting edge to observe the load placed on the implement when it rests on a surface. In this example, load cell sensor may not be attached to implement and delivers a signal 230 to controller 250 indicating the sensed load. After the implement is set up with load sensor, the implement may be removed from load sensor to carry out an operation.

Optical sensors including but not limited to fiber optic light meters, laser distance finders, laser continuity sensors and the like may be used to measure distances in real time, ensure that components have been mounted properly, are not warped or damaged and other sensing functions. For example, a distance sensor may be used to evaluate wear by monitoring a distance between the sensor and the surface S. In the road maintenance example, as a component that contacts the surface wears from contact with surface S, the height of the component decreases. A distance sensor that measures the gap between the sensor and the surface created by the component can measure wear as a function of the change in distance over time. Such sensors also would be used to monitor suspended components for purposes of monitoring the travel of components during operation. In a plow implement example, cutting edge may include blade segments that are supported on a flexible backer as in U.S. Pat. 9,290,898 or are encased in a flexible material as in U.S. Pat. 8,984,778 both of which are incorporated by reference. The travel of the blade by virtue of the backer or surround material could be monitored optically.

A laser or other light-wave continuity sensor may be used to detect warping, improper mounting, or damage of a linear component. For example, for plow implements, the cutting edge is generally a linear component. A laser/light continuity sensor with an emitter and detector arranged to emit a beam of light along the length of the cutting edge may detect warping, damage, or misalignment of the blade through interruption of the beam. Some plow implements use multiple segments to form a cutting edge as shown in the figures. In this instance, an improperly mounted segment may protrude and interrupt the beam. When the beam is interrupted, a sensor assembly 220 would send a signal indicating the sensed event. As in previous examples, this may create an alert for an operator and/or be saved in memory for later evaluation. As in other examples, these sensors may be used temporarily to align or otherwise setup components and/or check that components are in specification following use. Alternatively, the sensor may be mounted on implement 20 during operation to allow real time monitoring.

An inductance sensor may be used to monitor relative position between the sensor and a magnetic component for purposes of determining position and motion. In one example, an inductance sensor may be used to determine an angular position of a component and may be useful in ensuring that a component is properly aligned for optimal performance. Using the road maintenance example, performance often relies on a proper angular position or other positioning of the cutting edge in that the cutting edge does not cut, clean or groom the surface as well if it is outside of a selected range. Also, the wear rate of the cutting edge may increase if the component is outside of a selected range. In this example, an inductance sensor or other position sensor could be used to communicate to the operator that the component is within a selected range and/or outside of a selected range at a selected time such as during start up or setup, or during operation. If needed, this information could be communicated in real time as described in other examples.

Any of the sensors described above may be used in combination to provide additional information to a user, perform analysis to obtain a broader understanding of the components on a particular implement or relative to a selected number of components or implements. For example, a manufacturer may want to monitor components that it has sold, a procurement officer or maintenance person may wish to monitor components within a fleet under their control and/or compare components from various manufacturers. Simple examples of analysis using multiple sensors would include wear measurements, temperature measurements, resistance profiles and the like as a function of operating time (Hobbs meter). Overlays of noise over a velocity or acceleration plot to evaluate noise levels under different operating conditions. Location combined with noise or acceleration information to determine the location of an impact or other event detected by sensors.

The words used in the claims have their full ordinary meaning and are not limited in any way by the description of the embodiments in the specification. Further, as described herein, when one or more components are described as being connected, joined, affixed, coupled, attached, or otherwise interconnected, such interconnection may be direct as between the components or may be in direct such as through the use of one or more intermediary components. Also as described herein, reference to a "member," "component," or "portion" shall not be limited to a single structural member, component, or element but can include an assembly of components, members or elements.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasably or removably connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Examples

Example 1. A monitoring system that monitors at least one component of a cutting edge supported on an implement, the monitoring system comprising a monitor controller; at least one sensor in sensing communication with the at least one component, the at least one sensor configured to monitor wear of the at least one component; wherein the at least one sensor is connected to the monitor controller to communicate a sensor signal indicative of the wear of the at least one component to the monitor controller; the monitor controller including an output, wherein upon receiving a selected signal from the at least one sensor, the monitor controller is configured to communicate an alert via the output.

Example 2. The monitoring system of example 1, wherein the sensor includes a sensor housing and a lead extending from the sensor housing to a location adjacent to at least a portion of the component.

Example 3. The monitoring system of example 2, wherein the lead is supported adjacent to the component within a polymer matrix.

Example 4. The monitoring system of example 2 further comprising a channel formed in the at least one component; wherein the lead is supported at least partially within the channel.

Example 5. The monitoring system of example 4, wherein the channel extends inward toward the component and locates an end of the lead adjacent to an upper portion of the component.

Example 6. The monitoring system of example 4, wherein the channel is defined along a side of the component and extends parallel to a wear axis of the component.

Example 7. The monitoring system of example 1, wherein the sensor includes a lead housed within a shim placed adjacent to at least one component.

Example 8. The monitoring system of example 7, wherein the shim defines a channel that receives the lead.

Example 9. The monitoring system of example 1, wherein the sensor includes a thin film sensor that measures at least one of a temperature, a resistance and continuity or discontinuity.

Example 10. The monitoring system of example 1, wherein the sensor includes at least one of a temperature sensor, resistance sensor, electromagnetic sensor, continuity/discontinuity sensor, an inductance sensor, Hall effect sensor, acoustic sensor, accelerometer, velocity sensor, position sensor, Hobbs meter, load cell, laser sensor, and optic sensor.

Example 11. The monitoring system of example 1 wherein the sensor is supported adjacent to the component and parallel with a wear axis of the component, and wherein a portion of the sensor is subjected to wear along with the component during operation of the implement.

Example 12. The monitoring system of example 1, wherein the sensor monitors wear in real time and the signal includes real time feedback to the monitor controller.

Example 13. The monitoring system of example 10, wherein the sensor includes a sensor housing having a lead extending outward from the housing, wherein at least a portion of the lead is supported adjacent to the component within a channel defined in at least one of the component and the cutting edge, the lead extending parallel to a wear axis of the component at a depth corresponding to at least a portion of a height of the component, and wherein the lead is configured to wear at the same time as the component.

Example 14. The monitoring system of example 1, wherein the sensor includes a lead that forms a circuit, wherein a portion of the lead extends at a depth that is at least a portion of a height of the component, and wherein the component is subjected to wear that progressively reduces the height of the component, and wherein upon reaching the depth, the wear severs the portion of the lead causing the circuit to break and generate the signal to the monitoring controller.

Example 15. The monitoring system of example 1, wherein the sensor includes a communication assembly having a transmitter configured to wirelessly transmit the signal, and wherein the monitor controller includes a receiver to wirelessly receive the signal.

Example 16. The monitoring system of example 15, further comprising a central monitor controller remote from the sensor and the monitor controller; wherein the monitor controller further comprises a transmitter configured to communicate a monitor signal to the central monitor controller.

Example 17. The monitoring system of example 1, wherein the implement is configured to perform a road maintenance operation on a surface, and wherein the component is configured to contact the surface and is constructed of tungsten carbide.

Example 18. A monitoring system for monitoring at least one component in a cutting edge on an implement used in a road maintenance operation, the monitoring system comprising: a sensor assembly including a sensor housing and at least one sensor, the at least one sensor being in sensing communication with the at least one component; a transmitter connected to the at least one sensor, wherein the transmitter generates a sensor signal; a monitor controller including a receiver and an output, wherein the receiver is configured to receive the sensor signal and communicate an alert via the output.

Example 19. The monitoring system further comprising a central monitor controller remotely located relative to the monitor controller; the monitor controller includes a transmitter configured to generate a monitor signal that includes at least data from the sensor signal; wherein the central monitor controller is configured to selectively communicate with the monitor controller to receive the monitor signal therefrom.

Example 20. The monitoring system of example 18, where in the sensor is configured to monitor wear of the component along a wear axis in real time.

Example 21. The monitoring system of example 18, wherein the sensor housing having a lead extending outward from the housing, wherein at least a portion of the lead is supported adjacent to the component within a channel defined in at least one of the component and the cutting edge, the lead extending parallel to a wear axis of the component at a depth corresponding to at least a portion of a height of the component, and wherein the lead is configured to wear at the same time as the component.

Example 22. The monitoring system of the previous examples, wherein the sensor includes a lead having plural parallel conductive elements configured as continuity sensors, wherein as each of the plural parallel conductive element are cut by wear of the component, the sensor generates the alert.

Example 23. The monitoring system of the previous examples, wherein the at least one sensor includes plural sensors with each of the plural sensors monitoring a separate component of the cutting edge; and wherein the sensor signal includes data from each of the plural sensors.

Example 24. The monitoring system of example 23, where the output includes a display, the display including a wear indicator for each sensor communicating a wear status based on the signal received from each sensor.

Example 25. The monitoring system of example 23, wherein the cutting edge includes plural segments and where each of the plural sensors is mounted on a separate segment.

Example 26. The monitoring system of the previous examples, wherein the component is a carbide insert.

Example 27. The monitoring system of the previous examples, where the implement is a plow.

Example 28. The monitoring system of the previous examples, where the cutting edge includes a groove formed in a base thereof, and the component includes plural carbide inserts supported in the groove.

Example 29. The monitoring system of example 28 where the sensor includes a lead that is mounted within a shim, the shim being located between adjacent carbide inserts within the groove.

Example 30. The monitoring system of example 29, where the shim defines a channel in which the shim is received, and the lead includes an element having a known resistance based on its length and wherein a change in resistance indicative of wear of the lead is reported within the sensor signal.

The invention claimed is:

1. A monitoring system that monitors at least one component of a cutting edge supported on an implement, the monitoring system comprising:
   a monitor controller; at least one sensor having a lead in sensing communication with the at least one component, the at least one sensor configured to monitor wear of the at least one component; wherein the at least one sensor is connected to the monitor controller to communicate a sensor signal indicative of the wear of the at least one component to the monitor controller;

wherein the at least one sensor includes a sensor housing and a lead extending from the sensor housing to a location adjacent to at least a portion of the at least one component;

the monitor controller including an output, wherein upon receiving a selected signal from the at least one sensor, the monitor controller is configured to communicate an alert via the output; and a channel formed in the at least one component, wherein the lead is supported at least partially within the channel.

2. The monitoring system of claim 1, wherein the lead is supported adjacent to the at least one component within a polymer matrix.

3. The monitoring system of claim 1, wherein the channel extends inward toward the at least one component and locates an end of the lead adjacent to an upper portion of the component.

4. The monitoring system of claim 1, wherein the channel is defined along a side of the at least one component and extends parallel to a wear axis of the component.

5. The monitoring system of claim 1, wherein the at least one sensor includes a thin film sensor that measures at least one of a temperature, a resistance and continuity or discontinuity.

6. The monitoring system of claim 1, wherein the at least one sensor includes at least one of a temperature sensor, resistance sensor, electromagnetic sensor, continuity/discontinuity sensor, an inductance sensor, Hall effect sensor, acoustic sensor, accelerometer, velocity sensor, position sensor, Hobbs meter, load cell, laser sensor, and optic sensor.

7. The monitoring system of claim 1 wherein the at least one sensor is supported adjacent to the at least one component and parallel with a wear axis of the at least one component, and wherein a portion of the sensor is subjected to wear along with the at least one component during operation of the implement.

8. The monitoring system of claim 1, wherein the at least one sensor monitors wear in real time and the signal includes real time feedback to the monitor controller.

9. The monitoring system of claim 1, wherein the at least one sensor includes a communication assembly having a transmitter configured to wirelessly transmit the signal, and wherein the monitor controller includes a receiver to wirelessly receive the signal.

10. The monitoring system of claim 9, further comprising a central monitor controller remote from the at least one sensor and the monitor controller;

wherein the monitor controller further comprises a transmitter configured to communicate a monitor signal to the central monitor controller.

11. The monitoring system of claim 1, wherein the implement is configured to perform a road maintenance operation on a surface, and wherein the at least one component is configured to contact the surface and is constructed of tungsten carbide.

12. The monitoring system of claim 1 further comprising a central monitor controller remotely located relative to the monitor controller;

the monitor controller includes a transmitter configured to generate a monitor signal that includes at least data from the sensor signal;

wherein the central monitor controller is configured to selectively communicate with the monitor controller to receive the monitor signal therefrom.

13. A monitoring system that monitors at least one component of a cutting edge supported on an implement, the monitoring system comprising:

a monitor controller; at least one sensor in sensing communication with the at least one component, the at least one sensor configured to monitor wear of the at least one component;

wherein the at least one sensor is connected to the monitor controller to communicate a sensor signal indicative of the wear of the at least one component to the monitor controller;

the monitor controller including an output, wherein upon receiving a selected signal from the at least one sensor, the monitor controller is configured to communicate an alert via the output; and wherein the at least one sensor includes a lead housed within a shim placed adjacent to the at least one component.

14. The monitoring system of claim 13, wherein the shim defines a channel that receives the lead.

15. A monitoring system that monitors at least one component of a cutting edge supported on an implement, the monitoring system comprising:

a monitor controller; at least one sensor in sensing communication with the at least one component, the at least one sensor configured to monitor wear of the at least one component;

wherein the at least one sensor is connected to the monitor controller to communicate a sensor signal indicative of the wear of the at least one component to the monitor controller;

the monitor controller including an output, wherein upon receiving a selected signal from the at least one sensor, the monitor controller is configured to communicate an alert via the output;

wherein the at least one sensor includes a lead that forms a circuit, wherein a portion of the lead extends at a depth that is at least a portion of a height of the at least one component, and wherein the at least one component is subjected to wear that progressively reduces the height of the at least one component, and wherein upon reaching the depth, the wear severs the portion of the lead causing the circuit to break and generate the signal to the monitoring controller.

\* \* \* \* \*